United States Patent
Varakin et al.

(10) Patent No.: US 10,067,963 B2
(45) Date of Patent: Sep. 4, 2018

(54) METHOD FOR PRE-PROCESSING AND PROCESSING QUERY OPERATION ON MULTIPLE DATA CHUNK ON VECTOR ENABLED ARCHITECTURE

(71) Applicant: SQREAM TECHNOLOGIES LTD, Ramat Gan (IL)

(72) Inventors: Kostya Varakin, Haifa (IL); Ami Gal, Kfar HaOranim (IL)

(73) Assignee: SQREAM TECHNOLOGIES LTD., Ramat Gan (IL)

( * ) Notice: Subject to any disclaimer, the term of this patent is extended or adjusted under 35 U.S.C. 154(b) by 628 days.

(21) Appl. No.: 14/419,008

(22) PCT Filed: Jul. 31, 2013

(86) PCT No.: PCT/IL2013/050651
§ 371 (c)(1),
(2) Date: Feb. 2, 2015

(87) PCT Pub. No.: WO2014/020605
PCT Pub. Date: Feb. 6, 2014

(65) Prior Publication Data
US 2015/0213074 A1 Jul. 30, 2015

Related U.S. Application Data

(60) Provisional application No. 61/677,746, filed on Jul. 31, 2012.

(51) Int. Cl.
*G06F 7/00* (2006.01)
*G06F 17/30* (2006.01)

(52) U.S. Cl.
CPC .. *G06F 17/30321* (2013.01); *G06F 17/30424* (2013.01); *G06F 17/30445* (2013.01);
(Continued)

(58) Field of Classification Search
None
See application file for complete search history.

(56) References Cited

U.S. PATENT DOCUMENTS

2008/0111716 A1* 5/2008 Artan ............... G06F 17/30949
341/50
2008/0133561 A1* 6/2008 Dubnicki ............ G06F 11/1453
(Continued)

FOREIGN PATENT DOCUMENTS

WO 2006074014 A2 7/2006

OTHER PUBLICATIONS

Tarkoma et al., "Theory and Practice of Bloom Filters for Distributed Systems" IEEE 14, pp. 131-155, No. 1, (Mar. 2012).
(Continued)

*Primary Examiner* — Uyen Le
(74) *Attorney, Agent, or Firm* — Browdy and Neimark, PLLC

(57) ABSTRACT

A method for pre-processing and processing query operation on multiple data chunk on vector enabled architecture. The method includes receiving a user query having at least one a data item, accessing data chunk blocks having an enhanced data structure representation. The enhanced data structure representation includes data recursive presentation of data chunk boundaries and bloom filter bitmask of data chunks. The method further includes searching simultaneously at multiple data chunk blocks utilizing the recursive presentation of data chunk boundaries using a HardWare Accelerator (HWA), identifying data item address by comparing a calculated Bloom filter bitmask of the requested data item to a calculated bitmask of the respective data chunks simultaneously by using multiple HWAs, and executing query on respective data chunks.

20 Claims, 5 Drawing Sheets

(52) U.S. Cl.
CPC .. *G06F 17/30513* (2013.01); *G06F 17/30563* (2013.01); *G06F 17/30595* (2013.01)

(56) References Cited

U.S. PATENT DOCUMENTS

2010/0318759 A1* 12/2010 Hamilton ............ G06F 11/1451
711/171
2011/0252046 A1* 10/2011 Szabo ............... G06F 17/30985
707/758

OTHER PUBLICATIONS

Han et al., "Scatter-Gather-Merge: An efficient star-join query processing algorithm for data-parallel frameworks" Cluster Computing 14, pp. 183-197, No. 2, (Oct. 2010).

Yang et al., "Map-Reduce-Merge: Simplified Relational Data Processing on Large Clusters", 2007 ACM SIGMOD international conference on Management of Data, pp. 1029-1040, (Jun. 2007).

Rusu et al., "A Survey on Array Storage, Query Languages, and Systems" arXiv preprint arXiv1302.1013. (Feb. 2013).

* cited by examiner

METHOD FOR PRE-PROCESSING AND PROCESSING QUERY OPERATION ON MULTIPLE DATA CHUNK ON VECTOR ENABLED ARCHITECTURE

BACKGROUND

1. Technical Field

The present invention relates generally to running queries using a HardWare Accelerator (HWA) enhanced cluster of machines.

With the increasing growth of databases which are known as "BigData", there is a need to process more complex analysis algorithms Most of the "Big data" is stored in relational databases. One solution is processing data queries in parallel. These are known in the art as parallel computational processing which solve only specific tailored scenarios. There is a need for an enhanced data structure to enable efficient of processing queries of the "Big data" with GPU in a highly parallelized manner

BRIEF SUMMARY

The present invention provides a method for processing query operations on multiple data chunks on vector enabled architecture. The method comprising the following steps: receiving a user query having at least one data item, accessing data chunk blocks having enhanced data structure representation, wherein the enhanced data structure representation includes logical presentation of data chunk boundaries and bloom filter bitmasks of data chunks, searching simultaneously at multiple data chunk blocks utilizing the logical presentation of data chunk boundaries using HWA processors, identifying data item addresses by comparing a calculated Bloom filter bitmask of the requested data item to a calculated bitmask of the respective data chunks simultaneously by using multiple HWA and Executing query on respective data chunk.

According to some embodiments of the present invention, where there is a numerical data type, the logic representation further includes an indexed representation of data items based on calculated boundaries.

According to some embodiments of the present invention, the step of identifying address of the data items is applied only on non numeric code data items or numeric data items which were verified to appear in the data chunk based on the logical retranslation of calculated boundaries.

According to some embodiments of the present invention, the indexed representation of data items provides an enhanced data structure enabling better a compression ratio of the data chunks.

According to some embodiments of the present invention, the indexed representation of data items provides an efficient data structure for enabling enhanced search capabilities.

According to some embodiments of the present invention, the indexed representation of data items is created by calculating differences between adjacent data items and between data items and their assigned boundaries.

According to some embodiments of the present invention, the boundaries are calculated based on transformations on the input raw data to provide substantially equal logical groups of data items in between adjacent boundaries.

According to some embodiments of the present invention, the method further includes the step of determining data chunk size, based on static and dynamic architectural parameters of the HWA and data analysis of the raw data for supporting simultaneous multiple thread processing on the data chunk.

According to some embodiments of the present invention, the boundaries calculation is performed in recursive order by combining several data chunks together enabling calculating more inclusive boundaries together with more wide bloom filters.

According to some embodiments of the present invention, the simultaneous search at multiple data chunk blocks is performed recursively.

The present invention further provides a system for processing query operation on multiple data chunks on a vector enabled architecture. The system comprised of: a data structure enhancement module for providing an enhanced data chunk blocks structure having a logical presentation of data chunks based on calculated boundaries raw data analysis and a bloom filter bitmask of the data chunks; and an execution unit for searching simultaneously at multiple data chunk blocks utilizing the logical presentation of the data chunks using HWA processors, identifying addresses of a query data item by comparing the calculated Bloom filter bitmask of the requested data item to the calculated bitmask of the respective data chunks simultaneously by using multiple HWA processors and executing query on respective data chunks.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
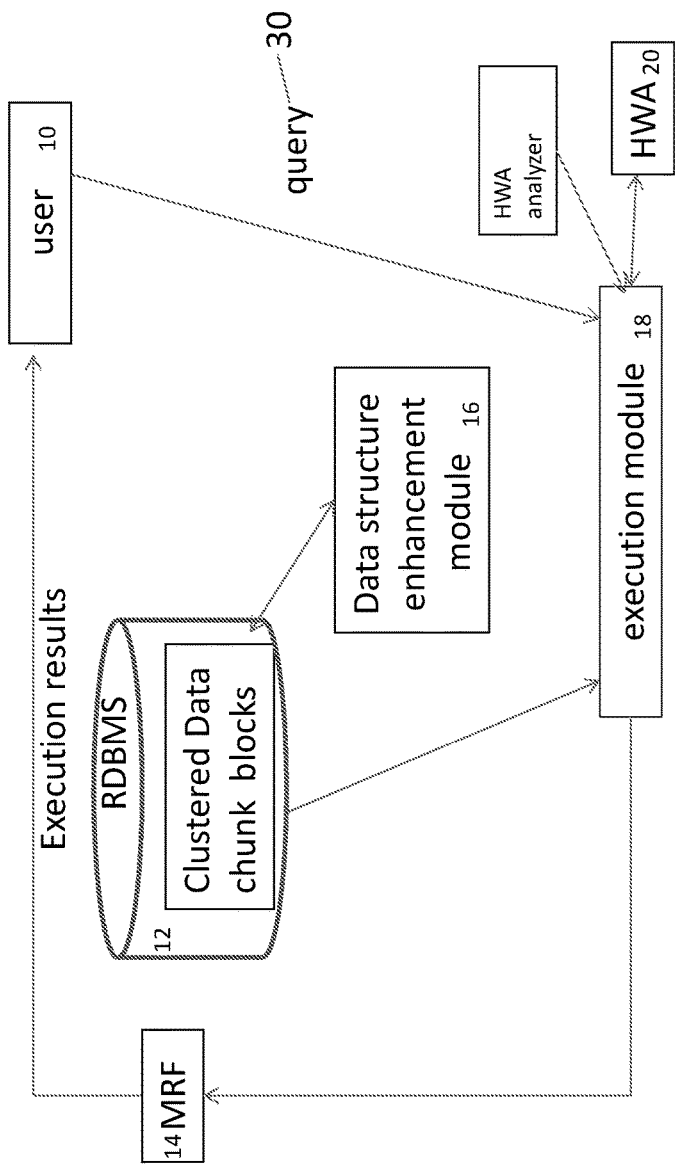
FIG. 1 illustrates a block diagram showing the entities and modules involved in processing user query using HWA, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The term "HWA (HardWare Accelerator)" as used herein in this application is defined as any hardware that is connected to a main CPU through a PCI bus and encompasses multiple computational cores inside. Example: GPGPUs (with 1000s of cores), and Intel MICs (with 10s of cores).

The term "MRF (Map-Reduce Framework)" as used herein in this application is defined as any software that is created for running computations in a Map-Reduce paradigm. Examples: Apache Hadoop, Nokia's The Disco Project, etc.

The term "ET: execution target" as used herein in this application is defined as any set of hardware components that is selected by a MRop picks to perform the MRop commands The term "Data Chunk" as used herein in this application is the atomic unit of rational database RDBMS orMRF.

The term "HWA kernel" as used herein in this application is defined as the unit of compiled software that runs on one or more HWAs.

The term "Numerical data" as used herein in this application may include integers, floating point, double precision, etc.

The present invention provides system and a method for pre-processing and processing a query of multiple data chunks.

FIG. 1 illustrates a block diagram showing the entities and modules involved in processing a user query using a HWA, according to some embodiments of the invention. A user (10) initiates a query (30), which is sent to the execution module (18). The execution module (18) runs the query on the Clustered Data chunk blocks stored on any server database, such as the RDBMS or MRF (12), using the HWA (20). At runtime, the clustered data chunks include an enhanced logic data structure representation which was created by the data structure enhancement module (16).

Figure 2:
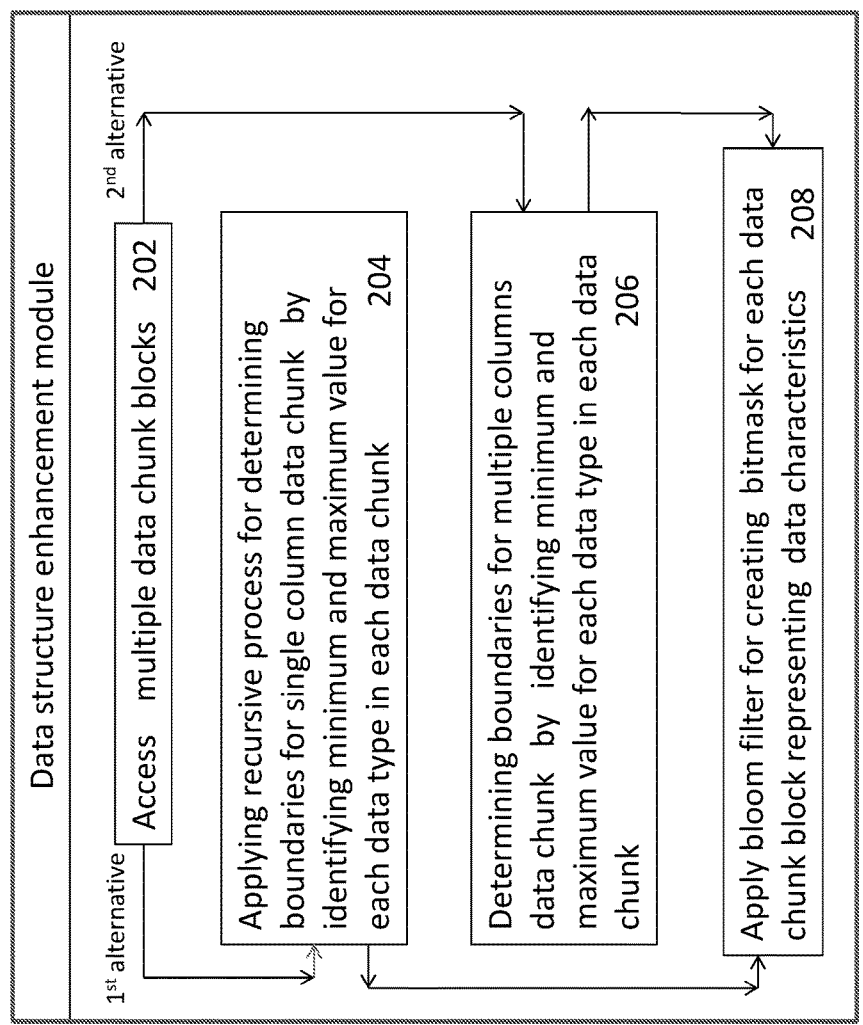
FIG. 2 is a flow diagram of Data structure enhancement module processing, according to some embodiments of the invention.

FIG. 2 is a flow diagram data structure enhancement module processing, according to some embodiments of the invention. The module accesses multiple data chunk blocks stored on a RDBMS or MRF databases (step 202). At the first step (204), a recursive procedure is applied for creating map representation boundaries for a single column of a data chunk by identifying minimum and maximum value for each data type in each data chunk. Alternatively, at step (206), a data map representation structure is created of boundaries for multiple columns data chunks by identifying minimum and maximum values for each data type in each data chunk.

The data representation is achieved by defining recursive synopsis data structures. A recursive traversing processing can be applied on the synopsis data structures using an HWA or any other vector architecture. Vector based architectures are used due to high computational throughput. At the next step (208) a Bloom filter is applied on all data chunks for creating metadata (i.e., a bitmask) for each data block, the metadata representing data characteristics of the data blocks.

The combination between of these representation of data structures and vector or multi-core architectures enables calculation of the position and address of a data item in an MRF or RDBMS storage or the size of an approximate data set in a very short time. Using these data structures, we enable the use of optimized memory size by keeping only a small representative derivative of the original data.

Figure 3:
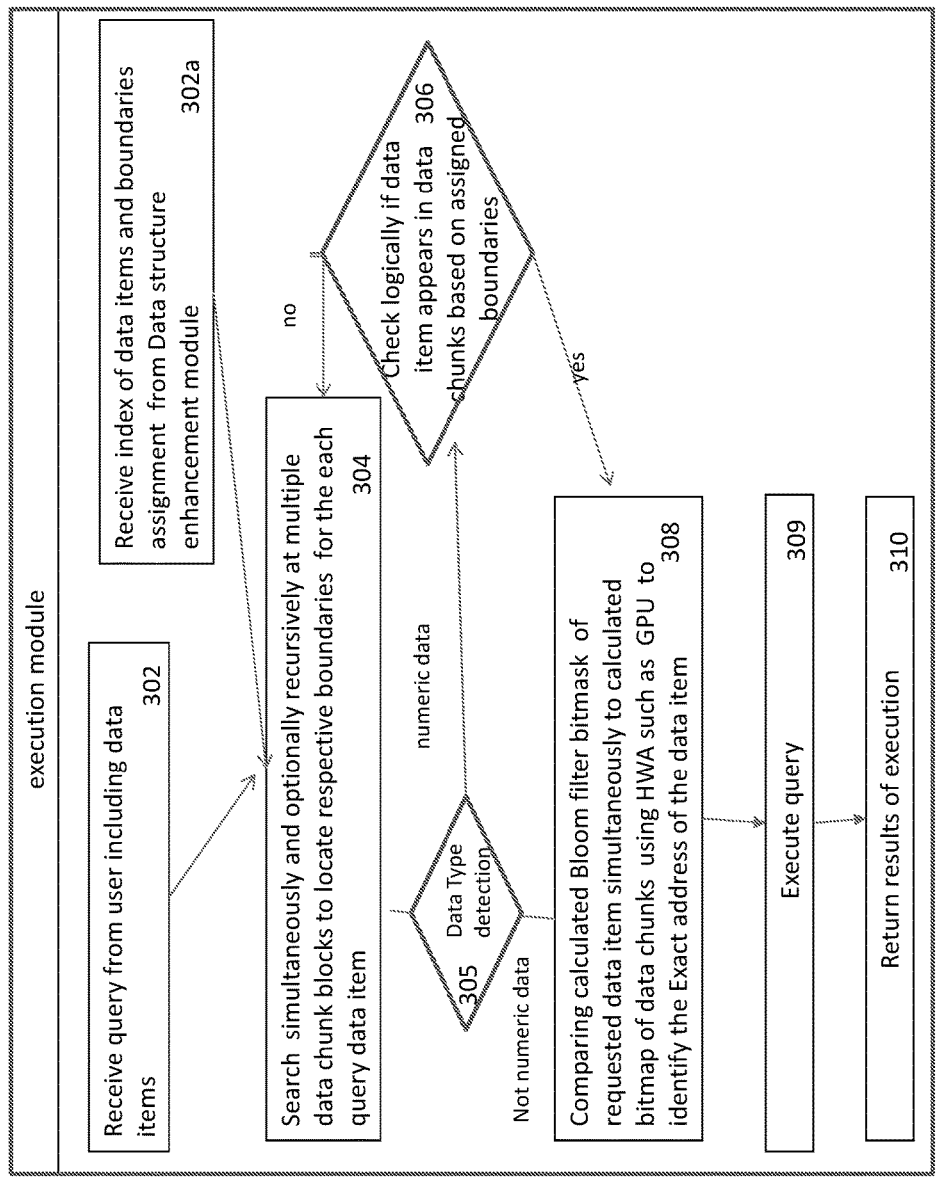
FIG. 3 is a flow diagram of execution module processing, according to some embodiments of the invention.

FIG. 3 is a flow diagram of execution module processing, according to some embodiments of the invention. At the first step, the query is received from a user including at least one data item (302) and an index of data items and boundaries assignment is received from the data structure enhancement module (302a). The execution module searches simultaneously at multiple data chunk blocks utilizing a created indexed data structure of boundaries assignment for locating the relevant data chunks for each data item of the query (304). In case the data items are numeric data, the module verifies logically if the data item appears in the data chunks (305). In case the verification result is negative, the search for the specific data item is stopped, returning to step (304) for checking the next data item. In case the verification result is positive, the next step of the search for the data item is processed for identifying the address of the requested data item by calculating a Bloom filter bitmask of data chunks to be compared to a calculated Bloom filter bitmask of the requested data item. This comparison is achieved at step (308) by using simultaneously multiple (thousands) of threads using a HWA such as a Graphics Processor Unit (GPU). Based on the identified address of the requested data item in the relevant chunk blocks, the query is executed (step 309) using a processing unit such as a Central Processing Unit (CPU) or an HWA and the results are sent back to the user (step 310). The processes of identifying and searching the data items, can be executed recursively on broaden defined boundaries. The module process can be conducted in a different order, for example, applying the bloom filter search before the boundaries search.

Figure 4:
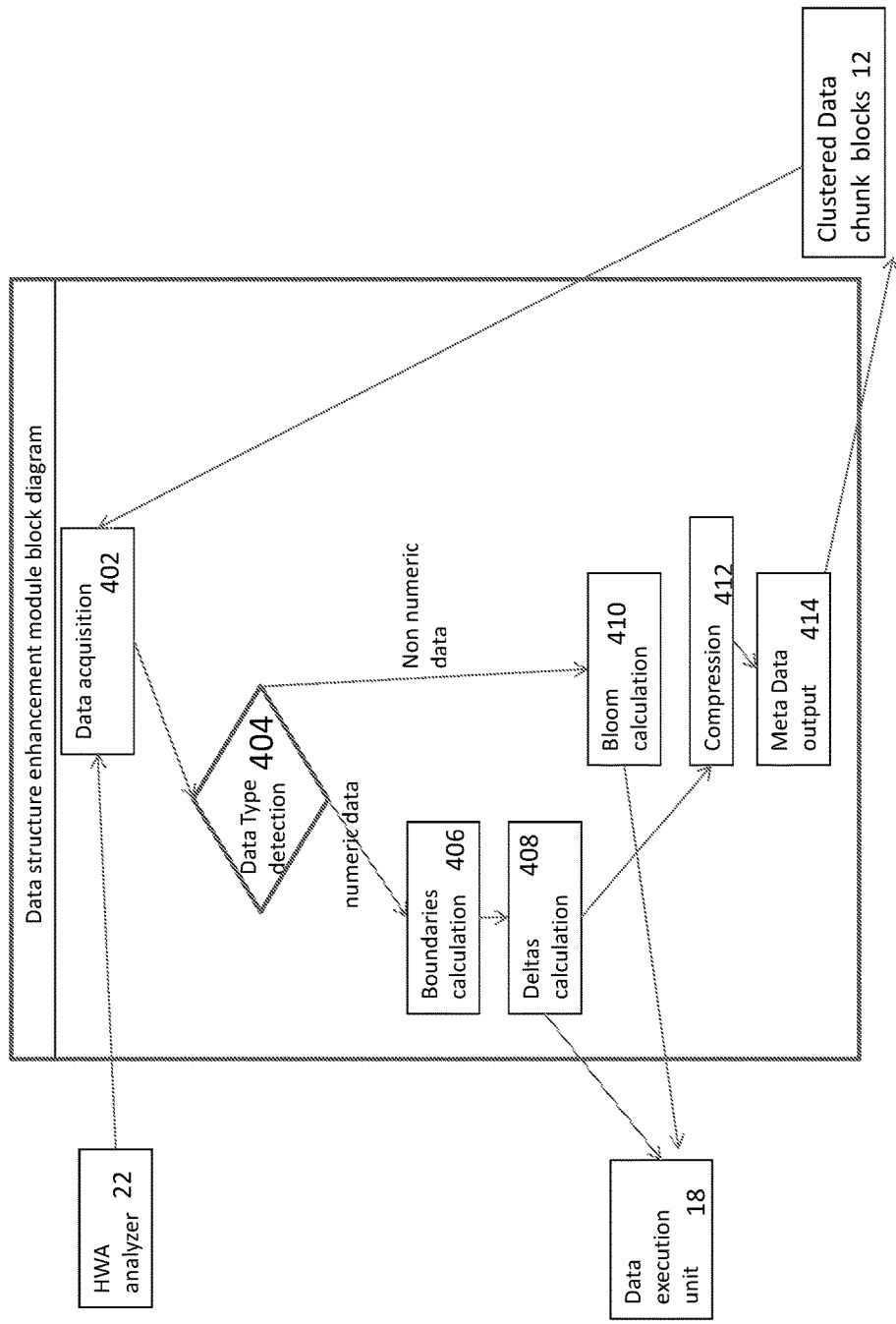
FIG. 4 is a block diagram of Data structure enhancement module, according to some embodiments of the invention.

FIG. 4 is a block diagram of the data structure enhancement module, according to some embodiments of the invention. This module includes a data acquisition unit (402) for receiving the raw data from any source, such as RDBMS or MRF databases. The acquisition unit determines the size of the data chunk, based on information received from the HWA analyzer (22) and data analysis of the raw data. This information of the HWA analyzer (22) includes static and dynamic architectural parameters. Static architectural parameters may include memory aligned access (e.g. 128, 256, 512 or more bytes for NVIDIA GPUs), the number of available threads in HWA, cache sizes (for MIC CPUs), or the amount of threads running simultaneously (E.g.: warp size on NVIDIA GPUs). Dynamic architectural parameters may include the amount of HWA's free memory. The calculation of chunk size takes into consideration at least one of the following rules: 1) supporting simultaneous thread processing on the data chunk, for example, data chunk size which is equal to warp size of NVIDIA GPU (which is multiplied with one of the values characterizing aligned memory access e.g. 128, 256 or 512 bytes); 2) supporting simultaneous processing of different warps inside the NVIDIA GPUs; or 3) the data chunk size is equal to the size of one of the caches inside cache hierarchy of the CPUs of the HWA, such as on the MIC chip.

The analysis of the raw data may include checking the integral size of input raw data atoms (414). For example, if the input stream consists of integral numbers and each number occupies 4 bytes, then the respective data chunk size may be based on the series 8, 16, 32, 64 . . . ).

In case the checked raw data is numeric, the data is further processed to perform a boundaries calculation (406) and a deltas calculation (408). In case of non numeric data, only bloom filtering and compression processing are applied (steps 410, 412). The boundaries calculation module (406) performs at least of the following transformations on the input raw data: histogram equalization method is applied to a plurality of data chunks for providing boundaries, where the number of data elements, in each logical group between two adjacent boundaries, is equal or substantially equal.

The calculated boundaries are conveyed to the deltas calculation module. The deltas calculation module (408) provides an index data representation of the data elements as further explained with respect to FIG. 5. The created index data representation provides a more enhanced data structure to enable better a compression ratio for the compression module, and a more efficient data structure for enabling enhanced search capabilities at the data execution unit 18. Every data item in original data structure points to the created data structure representation such as a histogram of chunk boundaries that consists of smaller chunk boundaries and bloom filter map.

According to some embodiments of the present invention, the boundaries and bloom filter calculations may be performed in recursive order by combining several data chunks together to enable calculating more inclusive boundaries together with wider bloom filters.

Figure 5:
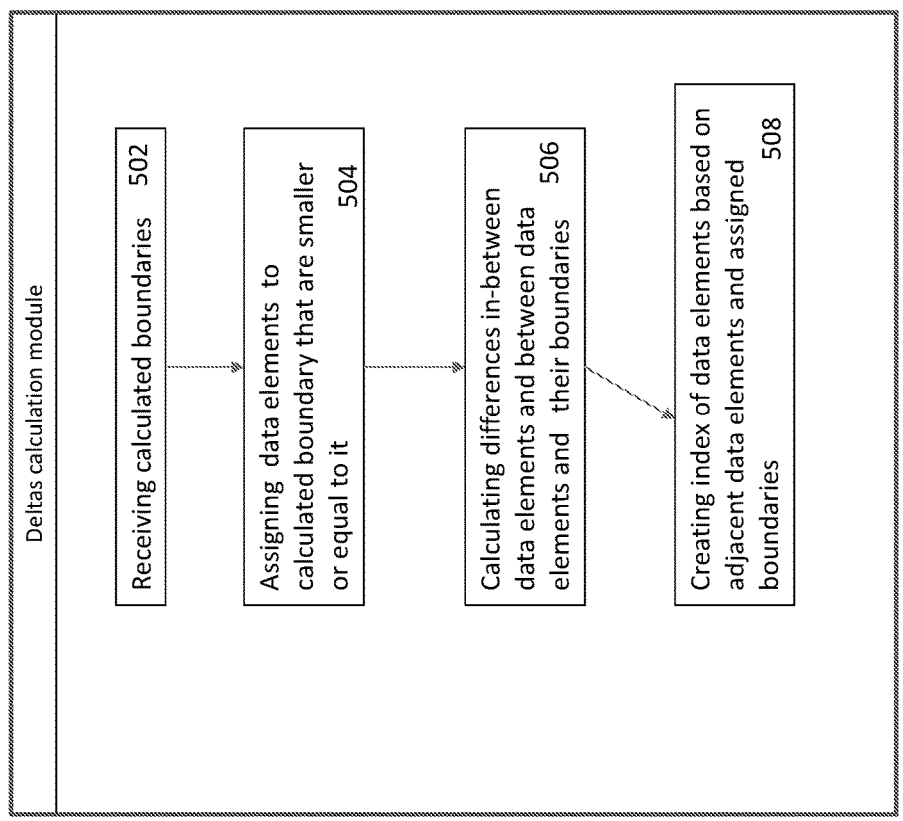
FIG. 5 is a flow diagram of delta calculations module processing, according to some embodiments of the invention.

FIG. 5 is a flow diagram of the delta calculations module processing, according to some embodiments of the invention. This module receives the receiving calculated boundaries (502), assigns each element to a pre-calculated boundary that is smaller or equal to it (504), calculates differences in-between data elements and between data elements and their boundaries (506), defining base data elements from which other data elements are defined and accordingly creates an index data representation of the basic data elements based on adjacent data elements and assigned boundaries (508). In such an index data representation, at least one data element is represented only by the difference from its basic data element or assigned boundaries. In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

What is claimed is:

1. A method for processing a query operation on multiple data chunks by a processor having a vector enabled architecture, said method comprising the step of:
   receiving from a user a user query having at least one data item;
   accessing the multiple data chunks having an enhanced data structure representation created in runtime, wherein the enhanced data structure representation includes boundaries and a bloom filter bitmask of the multiple data chunks, wherein the boundaries identify a minimum and a maximum value for each data type in each data chunk;
   performing a boundaries calculation and a bloom filter bitmask calculation to combine, in a recursive order, several data chunks, wherein the several data chunks are associated with inclusive boundaries and wide bloom filters, and wherein the recursive order defines recursive synopsis data structures;
   creating a map representation of the inclusive boundaries based on the enhanced data structure representation according to the recursive order, wherein said map representation includes the inclusive boundaries for a single column of the several data chunks
   searching for the at least one data item of the user query simultaneously in the multiple data chunks, using multiple Hardware Accelerator (HWA) processors and utilizing the map representation of the inclusive boundaries by applying a recursive search on the defined synopsis data structures, using the wide Bloom filter, in order to identify data chunks including the at least one data item;
   identifying a data item address, by comparing a calculated Bloom filter bitmask of the at least one data item to the calculated Bloom filter bitmask of the identified data chunks, by applying a Bloom filter simultaneously using multiple HWA processors on the identified data chunks;
   executing the user query of the at least one data item at the identified data item address and sending the results to the user.

2. The method of claim 1, wherein, when the data type of the multiple data chunks is numerical, and the map representation further includes an indexed representation of data items based on calculated boundaries.

3. The method of claim 2, wherein the step of identifying the data item address is applied only on non-numeric data items or numeric data items that were verified to appear in a data chunk based on a logical retranslation of the calculated boundaries.

4. The method of claim 2, wherein the indexed representation of data items provides an enhanced data structure resulting in an enhanced compression ratio of the data chunks.

5. The method of claim 2, wherein the indexed representation of data items provides an enhanced data structure for enabling enhanced search capabilities.

6. The method of claim 2, wherein the indexed representation of data items is created by calculating differences between adjacent data items and between data items and their assigned boundaries.

7. The method of claim 1, wherein the boundaries are calculated based on transformations of input raw data of the multiple data chunks to provide an equal or substantially equal number of data elements in logical groups between adjacent boundaries.

8. The method of claim 1, further comprising the step of determining a data chunk size, based on static and dynamic architectural parameters of the HWA processors and on data analysis of the raw data, to support simultaneous multiple thread processing of the multiple data chunks.

9. The method of claim 1, wherein the boundaries calculations generate the recursive order by combining several data chunks together to calculate the inclusive boundaries together with the wide bloom filters.

10. The method of claim 1, wherein simultaneous searching in multiple data chunks is performed recursively.

11. A system for processing a query operation on multiple data chunks, comprising a set of Hardware Accelerator (HWA) processors and a processor having a vector enabled architecture, said system configured by an instruction set to perform the steps of:
    receiving from a user a user query having at least one data item;
    accessing the multiple data chunks having an enhanced data structure representation created in runtime, wherein the enhanced data structure representation includes boundaries and a bloom filter bitmask of the multiple data chunks, wherein the boundaries identify a minimum and a maximum value for each data type in each data chunk;

performing a boundaries calculation and a bloom filter bitmask calculation to combine, in a recursive order, several data chunks, wherein the several data chunks are associated with inclusive boundaries and wide bloom filters, and wherein the recursive order defines recursive synopsis data structures;

creating a map representation of the inclusive boundaries based on the enhanced data structure representation according to the recursive order, wherein said map representation includes the inclusive boundaries for a single column of the several data chunks;

searching for the at least one data item of the user query simultaneously in the multiple data chunks, using multiple Hardware Accelerator (HWA) processors and utilizing the map representation of the inclusive boundaries by applying a recursive search on the defined synopsis data structures, using the wide Bloom filter, to identify data chunks including the at least one data item;

identifying a data item address, by comparing a calculated Bloom filter bitmask of the at least one data item to the calculated Bloom filter bitmask of the identified data chunks, by applying a Bloom filter simultaneously using multiple HWA processors on the identified data chunks; and executing the user query of the at least one data item at the identified data item address and sending the results to the user.

12. The system of claim 11, wherein, when the data type in the data chunk is numerical, and the map representation further includes an indexed representation of data items based on calculated boundaries.

13. The system of claim 12, wherein the identifying of the data item address is applied only on non-numeric data items or numeric data items which were verified to appear in the data chunk based the logical retranslation of the calculated boundaries.

14. The system of claim 12, wherein the indexed representation of data items provides an enhanced data structure resulting in an enhanced compression ratio of the data chunk.

15. The system of claim 12, wherein the indexed representation of data items provide an enhanced data structure for enabling enhanced search capabilities.

16. The system of claim 12, wherein the indexed representation of data items is created by calculating differences between adjacent data items and between data items and their assigned boundaries.

17. The system of claim 12, wherein the boundaries are calculated based on transformations of input raw data of the multiple data chunks to provide an equal or substantially equal number of data elements in logical groups between adjacent boundaries.

18. The system of claim 11, further comprising an acquisition data module for determining a data chunk size, based on static and dynamic architectural parameters of the HWA processors and data analysis of the raw data to support simultaneous multiple thread processing of the multiple data chunks.

19. The system of claim 11, wherein the boundaries calculations generate the recursive order by combining several data chunks together to calculate the inclusive boundaries together with the wide bloom filters.

20. The system of claim 11, wherein simultaneous searching in multiple data chunks is performed recursively.

* * * * *